United States Patent [19]

Kondo et al.

[11] 4,246,582
[45] Jan. 20, 1981

[54] FULL DUPLEX TRANSCEIVER COMPRISING HYBRID COIL AND AUTOMATIC IMPEDANCE ADJUSTMENT MEANS

[75] Inventors: Yoshiaki Kondo; Akira Okamoto, both of Tokyo, Japan

[73] Assignee: Ricoh Company, Ltd., Tokyo, Japan

[21] Appl. No.: 972,882

[22] Filed: Dec. 26, 1978

[30] Foreign Application Priority Data

Dec. 31, 1977 [JP] Japan .......................... 52-158476

[51] Int. Cl.³ ............................................. H04B 1/58
[52] U.S. Cl. ............................ 370/32; 179/170 G;
333/129; 455/79
[58] Field of Search ................. 343/176, 180; 325/21,
325/22, 23, 65; 333/118, 124, 126, 129, 130, 17
M, 32, 33, 263; 179/2.5 R, 170 G

[56] References Cited

U.S. PATENT DOCUMENTS

| 3,336,540 | 8/1967 | Kwartiroff et al. ............... 333/124 |
| 3,577,202 | 5/1971 | Brightman ....................... 179/2.5 R |
| 3,810,182 | 5/1974 | White et al. ..................... 343/180 |
| 3,822,366 | 7/1974 | O'Dea et al. ..................... 179/2.5 R |
| 3,867,589 | 2/1975 | Juner ............................. 179/170 G |
| 3,891,947 | 6/1975 | Debost et al. .................... 333/32 |
| 4,028,645 | 6/1977 | Tressa ............................ 343/180 |

Primary Examiner—Gerald L. Brigance
Attorney, Agent, or Firm—David G. Alexander

[57] ABSTRACT

Data signals are transmitted from a transmission unit (12) through a hybrid coil (16) and transmission line (18) to a remote transceiver. Data signals of a different frequency are received from the remote transceiver through the transmission line (18) and hybrid coil (16) in a full duplex mode and passed to a reception unit (26). A ratio of the signal levels of the received data signals passed through the hybrid coil (16) in a desired manner to transmitted data signals which leak through the hybrid coil (16) in an undesired manner is sensed at a reception signal output of the hybrid coil (16). The resistance of a variable resistance pad (17) provided in the transmission line (18) is varied in accordance with the sensed ratio so as to adjust the ratio to a predetermined optimum value. The sensed ratio is a predetermined function of the impedance of the transmission line (18) as viewed from the hybrid coil (16). The amplification factors of transmission and reception amplifiers (14), (22) are also varied to compensate for variations in attenuation of the transmitted and received signals by the resistance pad (17).

10 Claims, 3 Drawing Figures

FULL DUPLEX TRANSCEIVER COMPRISING HYBRID COIL AND AUTOMATIC IMPEDANCE ADJUSTMENT MEANS

BACKGROUND OF THE INVENTION

The present invention relates to a full duplex transceiver comprising a hybrid coil and automatic impedance adjustment means for use in a facsimile system, audio or video communication system, data transfer system or the like.

Full duplex transmission is well known in the art. Data signals of one frequency are transmitted from a local transceiver to a remote transceiver over a transmission line. Data signals of a different frequency transmitted by the remote transceiver are received by the local transceiver over the same transmission line. Each transceiver comprises a transmission unit for generating signals for transmission, a reception unit for processing received signals and a hybrid coil connecting the transmission and reception units to the transmission line. The hybrid coil is also known in the art as a bridge transformer and functions to pass transmitted signals from the transmission unit to the transmission line while preventing received signals from reaching the transmission unit. The hybrid coil also functions to pass received signals from the transmission line to the reception unit while preventing transmitted signals from reaching the reception unit.

In actual practice, the hybrid coil is not capable of completely preventing the transmitted signals from passing therethrough to the reception unit and there is a certain leakage of transmitted signals through the hybrid coil which reach the reception unit. This problem is generally overcome by providing a frequency selective filter between the hybrid coil and the reception unit. Typically, such a filter is embodied by a bandpass filter which passes only the received signals or a high or low pass filter. A high pass filter is used when the frequency of the received signals is higher than the frequency of the transmitted signals and rejects all frequencies below the frequency of the received signals. A low pass filter is used when the frequency of the received signals is lower than the frequency of the transmitted signals and rejects all frequencies above the frequency of the received signals.

Whereas such a filter generally attenuates the transmission leakage signals to a tolerable level, further problems are involved in a full duplex transceiver system of this type in that the performance of the hybrid coil is substantially influenced by the impedance of the transmission line as viewed from the hybrid coil. Where the impedance is of the proper value, generally on the order of 600Ω, and is constituted by pure resistance, the operation of the hybrid coil will be optimum. The rejection of transmitted leakage signals will be maximum, frequency response will be flat and there will be minimal phase distortion. However, as the impedance deviates from the optimum value the performance of the hybrid coil will become seriously degraded. Rejection of transmitted leakage signals will become insufficient and there will be substantial frequency and phase distortion of both the transmitted and received signals. As the transmission line is typically a public telephone line or the like having an impedance which varies over a considerable range and has an unpredictable value at any particular time, the quality of full duplex data transmission has heretofore ranged from excellent to unacceptable and has been beyond control.

SUMMARY OF THE INVENTION

A transceiver apparatus embodying the present invention comprises transmission means, reception means, hybrid coil means connecting the transmission means to the transmission line means, variable resistance means provided in the transmission line means, sensor means for sensing an impedance of the transmission line means as viewed from the hybrid coil means and control means for varying a resistance of the resistance means so as to adjust said impedance to a predetermined value.

Transmission amplifier means are connected between the transmission means and the hybrid coil means. Reception amplifier means are connected between the hybrid coil means and the reception means. The control means vary amplification factors of the transmission and reception amplifier means in such a manner as to compensate for signal attenuation by the resistance means.

It is an object of the present invention to provide a full duplex transceiver means comprising a hybrid coil and means for automatically sensing the impedance of a transmission line as viewed from the hybrid coil means and adjusting the impedance to a predetermined optimum value.

It is another object of the present invention to provide a generally improved full duplex transceiver.

Other objects, together with the foregoing, are attained in the embodiments described in the following description and illustrated in the accompanying drawing.

DESCRIPTION OF THE PREFERRED EMBODIMENTS

While the full duplex transceiver of the present invention is susceptible of numerous physical embodiments, depending upon the environment and requirements of use, substantial numbers of the herein shown and described embodiments have been made, tested and used, and all have performed in an eminently satisfactory manner.

Figure 1:
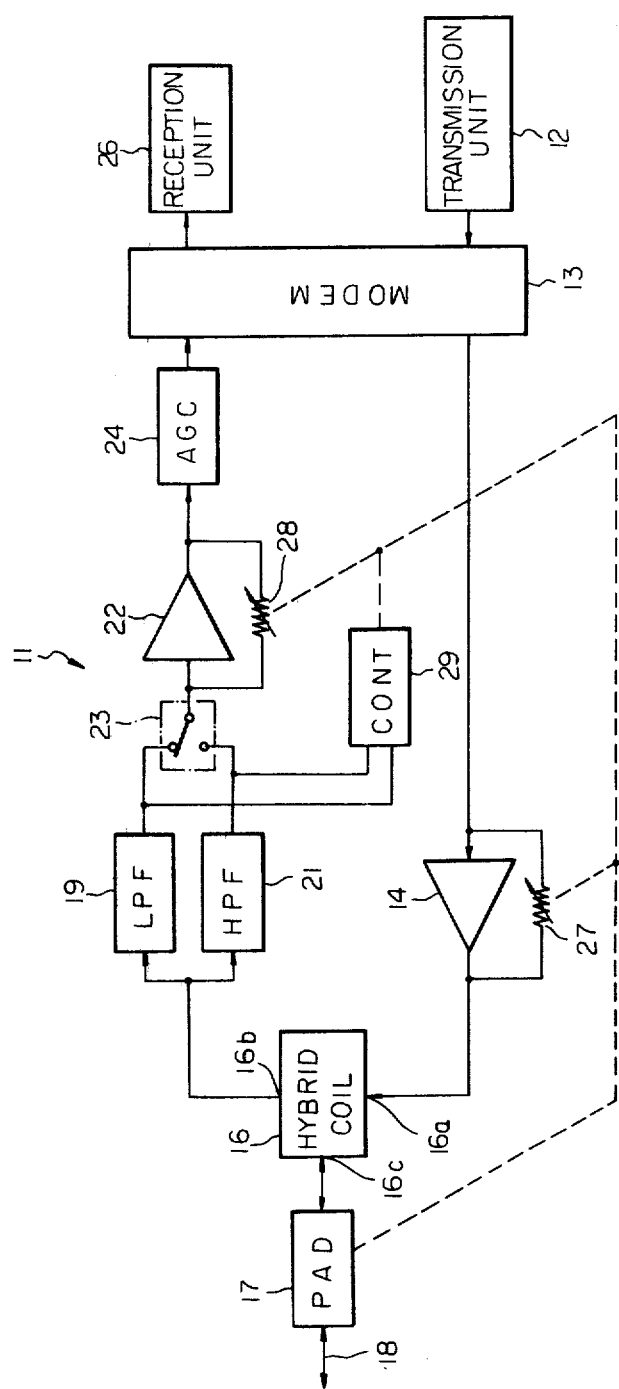
FIG. 1 is a schematic block diagram of a full duplex transceiver embodying the present invention.

Referring now to FIG. 1 of the drawing, a full duplex transceiver embodying the present invention is generally designated by the reference numeral 11 and comprises a transmission unit 12. A modem 13 functions to modulate a transmission carrier signal with data from the transmission unit 12 and feed the resulting transmitted signal through a transmission amplifier 14 to a hybrid coil 16. The transmitted data signals are fed through the hybrid coil 16 and a variable resistance pad 17 and transmission line 18 to a remote transceiver which is not shown. The signals are received and demodulated by the remote transceiver to recover the transmitted data. Simultaneously, the remote transceiver transmits a carrier signal modulated with data to the local transceiver 11. However, the carrier frequency of the signal received by the transceiver 11 is different from the carrier frequency of the signal transmitted by the transceiver 11.

The received signal is passed from the transmission line 18 and pad 17 through the hybrid coil 16 to inputs of a low pass filter 19 and a high pass filter 21. The input of a reception amplifier 22 is selectively connected by means of a switch 23 to the output of either the low pass filter 19 or the high pass filter 21. The output of the amplifier 22 is connected through an automatic gain control circuit 24 to the modem 13 which demodulates the received signal and feeds the recovered data to a reception unit 26. The output of the amplifier 14 is connected to a transmitted signal input 16a of the hybrid coil 16. The inputs of the filters 19 and 21 are connected to a reception or received signal output 16b of the hybrid coil 16. The pad 17 is provided in the transmission line 18 and connected to an input-output 16c of the hybrid coil 16. Further illustrated are variable feedback resistors 27 and 28 of the amplifiers 14 and 22 respectively.

The hybrid coil 16 functions to pass the transmitted signal from the amplifier 14 to the transmission line 18 while preventing the transmitted signal from reaching the filters 19 and 21. However, the hybrid coil 16 cannot accomplish this function completely and there is a certain amount of leakage of the transmitted signal through the hybrid coil 16 to the filters 19 and 21. The hybrid coil 16 further functions to pass the received signal from the transmission line 18 to the filters 19 and 21 while preventing the received signal from reaching the amplifier 14.

Where the transceiver 11 transmits signals to the remote transceiver using a high carrier frequency, the remote transceiver will transmit signals to the transceiver 11 using a low carrier frequency and vice-versa. It will be assumed for purposes of example that the transceiver 11 is set to transmit using the high carrier frequency and receive using the low carrier frequency and that the switch 23 connects the output of the low pass 19 filter to the input of the amplifier 22 as illustrated. Thus, the received signal (low carrier frequency) is passed through the filter 19 to the amplifier 22 while the transmitted signal (high carrier frequency) is blocked by the filter 19. For receiving signals using the high carrier frequency the switch 23 would be changed over to connect the output of the high pass filter 21 to the input of the amplifier 22.

The pad 17 comprises at least one variable resistance element and may be constituted by a single resistor, a plurality of resistors connected in series or parallel or a plurality of resistors connected in a T-pad, H-pad or any other known arrangement. If desired, two or more resistors may be varied in a ganged manner. The particular arrangement of the resistance elements in the pad 17 is not the particular subject matter of the present invention and may be synthesized as required by practical circuit considerations.

The outputs of the filters 19 and 21 are connected to inputs of a control unit 29 which is connected to adjust the resistance values of the pad 17 and feedback resistors 27 and 28.

The performance of the hybrid coil 16 and thereby the ratio of the reception signal level (signal level of the received signals passed from the transmission line 18 through the hybrid coil 16 to the filters 19 and 21) to the transmission leakage signal level (signal level of transmitted signals undesirably leaked from the amplifier 14 through the hybrid coil 16 to the filters 19 and 21) is a predetermined function of the impedance of the transmission line (including the pad 17) as viewed from the input-output 16c of the hybrid coil 16. By sensing the ratio of the reception signal level to the transmission leakage signal level the control unit 29 analogously senses the impedance of the transmission line 18 which is considered as including the pad 17. The filters 19 and 21 pass therethrough the received signal and leaked transmission signal respectively.

Based on the sensed ratio, the control unit 29 functions to adjust the resistance of the pad 17 until the sensed signal ratio (transmission line impedance) attains a predetermined optimum value. Since the pad 17 attenuates both the transmitted and received signals, the control unit 29 is further constructed to vary the resistance values of the feedback resistors 27 and 28 and thereby the amplification factors of the amplifiers 14 and 22 respectively to compensate for the signal attenuation by the pad 17. If the control unit 29 increases the resistance of the pad 17 and thereby the amount of signal attenuation, the control unit 29 will also increase the resistance values of the feedback resistors 27 and 28 and thereby the amplification factors of the amplifiers 14 and 22 so that the increased amplification by the amplifiers 14 and 22 exactly equals and cancels the signal attenuation by the pad 17. Thus, the levels of the signals received by both the transceiver 11 and the non-illustrated remote transceiver will be the same regardless of the resistance of the pad 17. The resistance values of the feedback resistors 27 and 28 and thereby the amplification factors of the amplifiers 14 and 22 will be reduced by the control unit 29 when the resistance of the pad 17 is reduced by the control unit 29.

The amplifiers 14 and 22 are typically constituted by operational amplifiers, the amplification factors of which in either the inverting or non-inverting configuration increase as the feedback resistance is increased. Preferably, the amplification factors of the amplifiers 14 and 22 will be increased or decreased by the same amount the resistance of the pad 17 is varied.

In the manner described, the impedance of the transmission line 18 including the pad 17 as viewed from the hybrid coil 16 is automatically adjusted to an optimum value in response to variations in the impedance of the transmission line 18 external of the transceiver 11 and pad 17. This is accomplished by increasing the resistance of the pad 17 as the impedance of the external portion of the transmission line 18 decreases and vice-versa.

Figure 2:
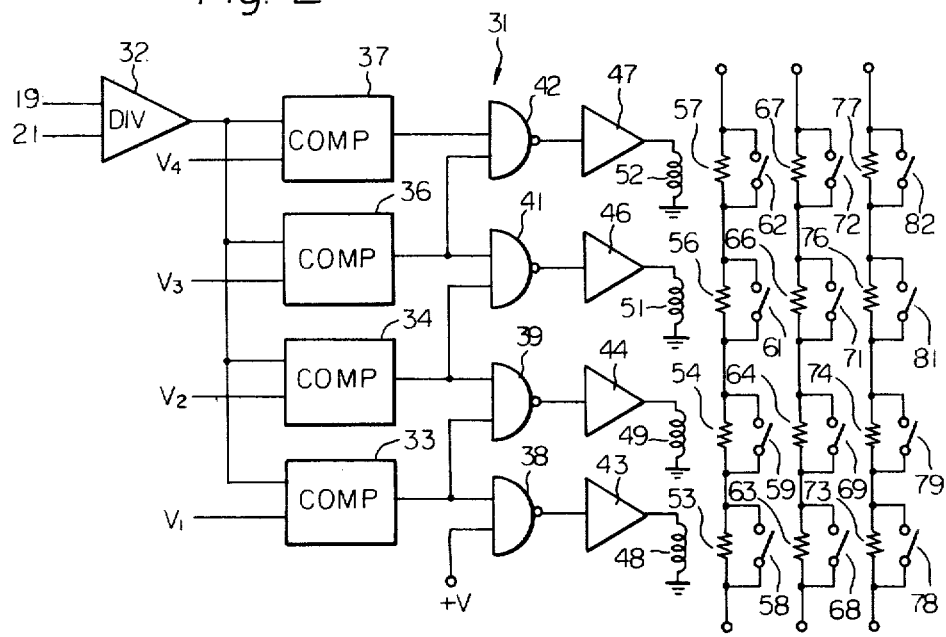
FIG. 2 is a schematic diagram of a first embodiment of impedance adjustment means of the present transceiver.

A first embodiment of the control unit 29 is shown in FIG. 2 and re-designated as 31. The control unit 31 comprises a divider 32 having inputs connected to outputs of the filters 19 and 21. The divider 32 is constructed to produce an output signal proportional to the ratio of the reception signal level to the transmission leakage signal level. The output of the divider 32 is connected to inputs of voltage comparators 33, 34, 36 and 37. Other inputs of the voltage comparators 33, 34, 36 and 37 are connected to receive reference voltages V1, V2, V3 and V4 respectively. The levels of the voltages V1, V2, V3 and V4 are progressively higher with V1 being the lowest and V4 being the highest.

Outputs of the voltage comparators 33, 34, 36 and 37 are connected to inputs of NAND gates 38, 39, 41 and 42 respectively. In addition, the outputs of the comparators 33, 34 and 36 are connected to other inputs of the NAND gates 39, 41 and 42 respectively. Another input of the NAND gate 38 is connected to a positive D.C. source +V.

The outputs of the NAND gates 38, 39, 41 and 42 are connected through driver amplifiers 43, 44, 46 and 47 to ground through relay coils 48, 49, 51 and 52 respectively.

The pad 17 is constituted by resistors 53, 54, 56 and 57 connected in series. Relay contacts 58, 59, 61 and 62 which are normally open and closed upon energization of the coils 48, 49, 51 and 52 are connected in parallel with the resistors 53, 54, 56 and 57 respectively.

The feedback resistor 27 for the amplifier 14 is constituted by resistors 63, 64, 66 and 67 connected in series. Relay contacts 68, 69, 71 and 72 which are normally open and which are closed upon energization of the coils 48, 49, 51 and 52 are connected in parallel with the resistors 63, 64, 66 and 67 respectively.

The feedback resistor 28 for the amplifier 22 is constituted by resistors 73, 74, 76 and 77 connected in series. Relay contacts 78, 79, 81 and 82 which are normally open and which are closed upon energization of the coils 48, 49, 51 and 52 are connected in parallel with the resistors 73, 74, 76 and 77 respectively.

The ratio of the reception signal level to the transmission leakage signal level increases as the impedance of the transmission line 18 decreases. Under these circumstances it is required to increase the resistance of the pad 17 to compensate for the reduced impedance of the external portion of the transmission line 18. The output of the divider 32 is proportional to the sensed ratio and therefore inversely proportional to the impedance of the transmission line 18 including the pad 17.

When the impedance of the transmission line 18 is extremely high and sensed ratio and therefore the output signal level of the divider 32 are extremely low, below the reference voltage V1, all of the NAND gates 38, 39, 41 and 42 produce high outputs which energize the driver amplifiers 43, 44, 46 and 47 and thereby the relay coils 48, 49, 51 and 52. This has the effect of closing all of the relay contacts illustrated and shorting out all of the resistors connected in parallel with the relay contacts. Thus, the resistances of the pad 17 and the feedback resistors 27 and 28 are minimum (zero). This causes the impedance of the transmission line 18 to decrease toward the predetermined value which in the control unit 31 is the range between the reference voltages V2 and V3.

The NAND gates 38, 39, 41 and 42 will produce high outputs as long as at least one input is low and will produce low outputs only when both inputs are high. With the output of the divider 32 below V1, the output of the comparator 33 is low which causes the NAND gate 38 to produce a high output even though the other input thereof connected to the source +V is logically high. The low outputs of the comparators 34, 36 and 37 connected to the inputs of the NAND gates 39, 41 and 42 cause the NAND gates 39, 41 and 42 to produce high outputs.

Assuming that the output of the divider 32 is between the reference voltages V1 and V2 the comparator 33 will produce a high output while the other comparators 34, 36 and 37 will produce low outputs. The high output of the comparator 33 causes the output of the NAND gate 38 to go low since the other input connected to the source +V is high. This de-energizes the amplifier 43 and relay coil 48 which in turn causes the relay contacts 58, 68 and 78 to open. The resistors 53, 63 and 73 are thereby unshorted to constitute the resistances of the pad 17 and feedback resistors 27 and 28 respectively. In other words, the resistance values of the pad 17 and feedback resistors 27 and 28 are increased from zero to the resistance values of the resistors 53, 63 and 73. This increases the impedance of the transmission line 18.

Where the output of the divider 32 is between the reference voltages V2 and V3, the outputs of the comparators 33 and 34 are both high. The output of the NAND gate 38 remains low with the above described effect. However, the output of the NAND gate 39 also goes low to de-energize the relay coil 49 and unshort the resistors 54, 64 and 74. This is because the outputs of the comparators 33 and 34 which are applied to the NAND gate 39 are both logically high.

In this case, the resistance of the pad 17 is constituted by the resistance values of the resistors 53 and 54 in series. The resistance values of the feedback resistors 27 and 28 are increased by unshorting the resistors 64 and 74 by means of opening the relay contacts 69 and 79 respectively.

When the output of the divider 32 is between the reference voltages V3 and V4, the NAND gate 41 produces a low output to de-energize the relay coil 51 and unshort the resistors 56, 66 and 76 to further increase the resistances of the pad 17 and feedback resistors 27 and 28.

When the output of the divider 32 is above the reference voltage V4, the outputs of all of the comparators 33, 34, 36 and 37 will be high and the outputs of all of the NAND gates 38, 39, 41 and 42 will be low. All of the relay coils 48, 49, 51 and 52 will be de-energized and all of the resistors illustrated will be unshorted by the respective relay contacts. In this case, the resistance of the pad 17 and feedback resistors 27 and 28 will be maximum.

Figure 3:
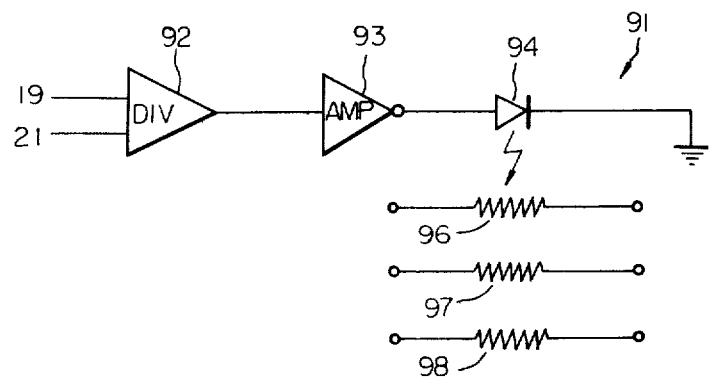
FIG. 3 is a schematic diagram of a second embodiment of impedance adjustment means of the present transceiver.

Whereas the control unit 31 functions to vary the resistance of the pad 17 and feedback resistors 27 and 28 in a stepwise manner, a control unit 91 shown in FIG. 3 varies the resistances in a continuous manner. The control unit 91 comprises a divider 92 which is identical to the divider 32 and is connected to the outputs of the filters 19 and 21. The output of the divider 92 is connected to ground through an inverting amplifier 93 and a light emitting diode (LED) 94 which functions as a light source. The pad 17 and feedback resistors 27 and 28 are constituted by photoresistors 96, 97 and 98 which are illuminated by the LED 94.

As the impedance of the transmission line 18 increases, the output of the divider 92 decreases. This causes increased current flow through the LED 94 and a greater intensity of light emitted therefrom. The increase in the incident light level on the photoresistors 96, 97 and 98 causes the resistances thereof to decrease. This has the effect of reducing the impedance of the transmission line 18 and increasing said ratio to the predetermined value.

The opposite effect occurs when the impedance of the transmission line 18 decreases and the output of the divider 92 increases. The output of the inverting amplifier 93 and the current flow through the LED 94 decrease. The resistances of the photoresistors 96, 97 and 98 increase, thereby increasing the resistance of the pad 17 and transmission line 18.

In summary, it will be seen that the present invention functions to automatically adjust the effective impedance of a transmission line to a predetermined optimum value, thereby ensuring optimum data transmission under all conditions. Various modifications will become possible for those skilled in the art after receiving the teaching of the present disclosure without departing from the scope thereof. For example, the control units shown and described may be adapted to adjust the resistance of the pad 17 in such a manner as to maximize the ratio of received signal level to transmission leakage signal level, rather than adjust the ratio to a predetermined value or range. A further modification would be to adapt the apparatus to maintain the ratio above a predetermined value.

What is claimed is:

1. A transceiver apparatus including transmission means, reception means, transmission line means and hybrid coil means connecting the transmission means and reception means to the transmission line means, characterized by comprising:
    variable resistance means provided in the transmission line means;
    sensor means for sensing an impedance of the transmission line means as viewed from the hybrid coil means; and
    control means responsive to the sensor means for automatically varying a resistance of the resistance means so as to adjust said impedance to a predetermined value.

2. An apparatus as in claim 1, further comprising transmission amplifier means connected between the transmission means and the hybrid coil means; and reception amplifier means connected between the hybrid coil means and the reception means, the control means varying amplification factors of the transmission and reception amplifier means in such a manner as to compensate for signal attenuation by the resistance means.

3. An apparatus as in claim 1, in which the sensor means is constructed to sense a ratio of a reception signal level to a transmission leakage signal level appearing at a reception signal output of the hybrid coil means which is a predetermined function of said impedance.

4. An apparatus as in claim 3, in which the control means is constructed to increase the resistance of the resistance means as said ratio increases and vice-versa.

5. An apparatus as in claim 1, in which the control means comprises a light source which emits light having an intensity corresponding to said impedance, the resistance means comprising a photoresistor illuminated by the light source.

6. An apparatus as in claim 5, in which the control means is constructed to increase the intensity of the light source as said impedance increases.

7. An apparatus as in claim 1, in which the transmission means is constructed to transmit data signals at a first frequency and the reception means is constructed to receive data signals at a second frequency which is different from the first frequency, the hybrid coil separating the transmitted data signals from the received data signals in such a manner that the apparatus operates in a full duplex mode.

8. A transceiver apparatus including transmission means, reception means, transmission line means and hybrid coil means connecting the transmission means and reception means to the transmission line means, characterized by comprising:
    variable resistance means provided in the transmission line means;
    sensor means for sensing a ratio of a reception signal level to a transmission leakage signal level appearing at a reception signal output of the hybrid coil means; and
    control means responsive to the sensor means for automatically varying a resistance of the resistance means so as to adjust said ratio to within a predetermined range.

9. A transceiver apparatus including transmission means, reception means, transmission line means and hybrid coil means connecting the transmission means and reception means to the transmission line means, characterized by comprising:
    variable resistance means provided in the transmission line means;
    sensor means for sensing an impedance of the transmission line means as viewed from the hybrid coil means; and
    control means responsive to the sensor means for automatically varying a resistance of the resistance means so as to adjust said impedance to a predetermined value;
    the sensor means being constructed to sense a ratio of a reception signal level to a transmission leakage signal level appearing at a reception signal output of the hybrid coil means which is a predetermined function of said impedance;
    the sensor means comprising frequency selective filter means for separating a reception signal and a transmission leakage signal and divider means for dividing the reception signal level by the transmission leakage signal level to produce said ratio.

10. An apparatus as in claim 9, in which the resistance means comprises a plurality of resistors connected in series, the control means comprising a plurality of switches for shorting the respective resistors in accordance with said ratio.

* * * * *